May 14, 1935. G. DE VRIES 2,001,241
FISHING FLOAT
Filed Jan. 18, 1934
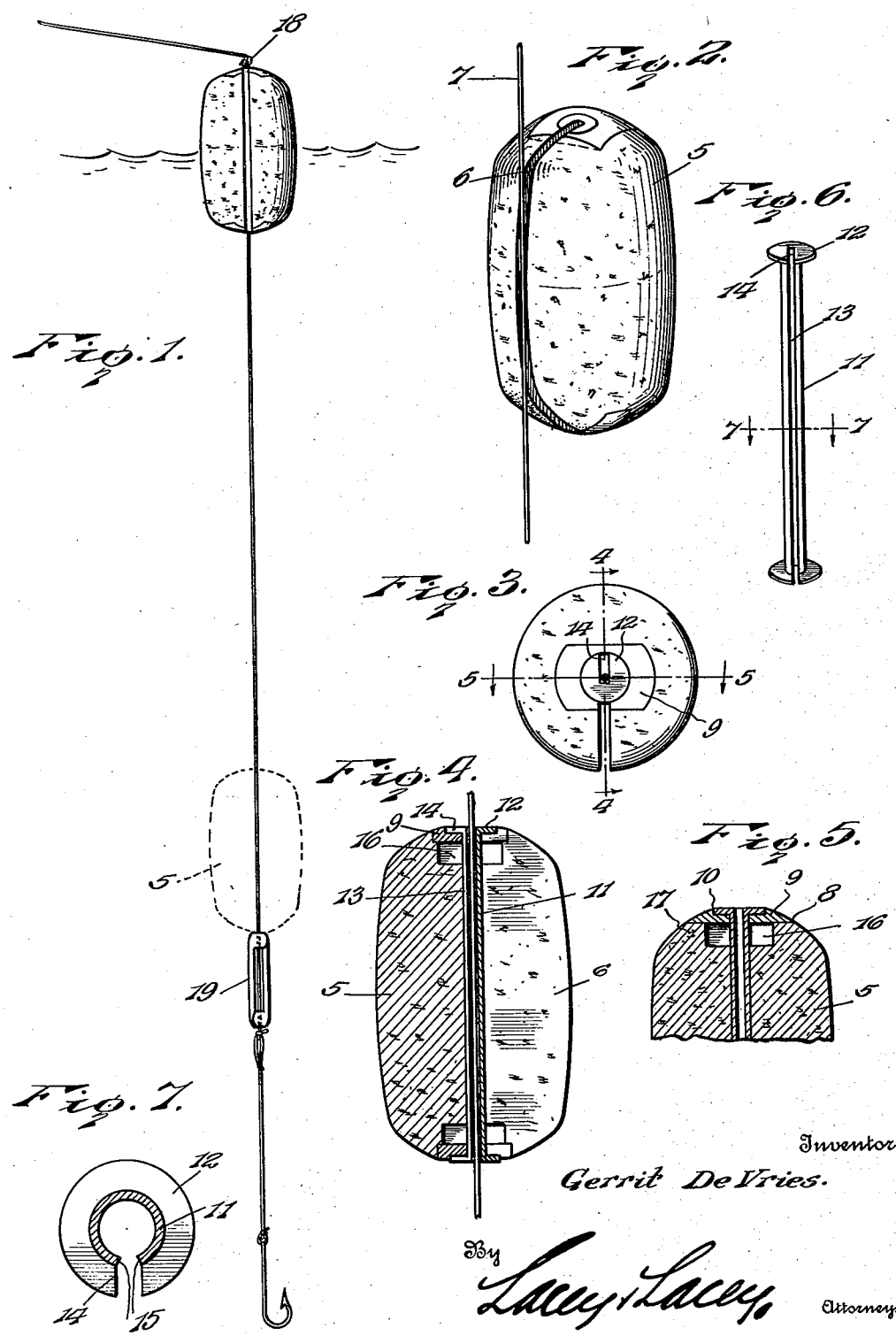
Inventor
Gerrit DeVries.
By Lacey & Lacey, Attorneys Patented May 14, 1935

2,001,241

UNITED STATES PATENT OFFICE 2,001,241

FISHING FLOAT

Gerrit De Vries, Pipestone, Minn.

Application January 18, 1934, Serial No. 707,173

3 Claims. (Cl. 43—49)

This invention relates to a casting float or bobber for fishing lines and has for its object to provide a comparatively simple and thoroughly efficient device of this character capable of being quickly and easily placed in position on a line without the necessity of threading the line through the bobber and which may be readily removed from the line after it has served its purpose.

A further object of the invention is to provide a float or bobber having a longitudinally slotted tube mounted for rotation therein and adapted, when turned in one direction, to register with a slot in the float to permit the insertion of a fishing line and, when turned in another direction, to close the slot in the float and prevent accidental separation of the float from the line.

A further object of the invention is to provide the opposite ends of the float with hardened bearing members or blocks having recesses therein for the reception of enlarged heads on the line-receiving tube whereby to form terminal bearings for said tube and permit easy turning of the float relative to the tube or vice versa.

A further object is to provide a float including a cork or other yieldable body portion having terminal recesses therein normally covered by the bearing blocks so that inward pressure exerted on said blocks will tend to compress the cork and permit easy seating of the heads in the tube.

A still further object of the invention is generally to improve this class of devices so as to increase their utility, durability and efficiency.

In the accompanying drawing forming a part of this specification, Figure 1 is a side elevation of a casting float or bobber embodying the present invention, showing in dotted lines the position of the bobber when making a cast and in full lines the position of the bobber when fishing.

Figure 2 is a perspective view of the bobber detached showing the line ready to be inserted in the slot of the bobber.

Figure 3 is a top plan view showing the tube rotated to hold the bobber in position on the line.

Figure 4 is a vertical longitudinal sectional view taken on the line 4—4 of Figure 3.

Figure 5 is a transverse longitudinal sectional view taken on the line 5—5 of Figure 3.

Figure 6 is a detail perspective view of the line-receiving tube removed.

Figure 7 is an enlarged transverse sectional view taken on the line 7—7 of Figure 6.

Similar numerals of reference indicate corresponding parts in all the figures of the drawing.

The improved casting float or bobber, forming the subject-matter of the present invention, comprises a body portion 5, preferably elliptical in shape, as shown, and formed of cork or other light yieldable material. The body portion 5 is provided with a longitudinally disposed slot 6 extending to approximately the center of the float and opening through one side thereof, as shown, to permit the insertion of a fishing line, indicated at 7. The opposite ends of the body portion 5 are cut away to form recesses 8 in which are seated bearing members or blocks 9, preferably formed of wood or other hard material, the outer faces of said blocks being provided with circular seats 10.

Mounted for turning movement in the body portion 5 is a line-receiving tube 11 which extends for the entire length of the body and is provided with flat, relatively large, disk-like heads 12 which fit within the seats 10 so as to permit relative turning movement of the tube with respect to the body of the float. The tube 11 is provided with a longitudinal slot 13 which intersects the disk-like heads 12, as indicated at 14 and the side walls of the slot 13 are preferably outwardly inclined, as indicated at 15, to assist in guiding the line 7 within the tube when positioning the float on a fishing line. The cork or other material constituting the body of the float is preferably cut away immediately adjacent the bearing blocks 9 to provide recesses 16 and these recesses render the material at the opposite ends of the float relatively thin, as indicated at 17, so that the cork or other material may be readily compressed when inward pressure is exerted on the bearing blocks to permit seating of the heads 12 in said bearing blocks.

In applying the casting bobber to a fishing line, the bobber is grasped in the hand with the thumb bearing against one of the heads 12 of the tube and with the index finger bearing against the other. The bobber is then rotated until the slot 13 in the tube registers with the slot 6 in the body of the float and the fishing line is pressed laterally within the slot 6 until said line enters the tube, after which a slight turning movement of the bobber, relative to the tube, will bring the slot 13 in the bobber out of registration with the slot 6 in the bobber and thus hold the bobber in position on the fishing line. It will, of course, be understood that the cross sectional diameter of the tube 11 is such as to permit free sliding movement of the bobber on the fishing line so as not to interfere with the casting operation. In order to remove the bobber, it is merely necessary to rotate the body portion until the slot 13 in the tube registers with the slot 6 in the body 5 when the float or bobber may be removed laterally from the line.

In casting the line, a knot 18 is formed therein at the depth desired and above the sinker 19, after which the bobber is positioned against the sinker 19, as indicated in dotted lines in Figure 1 of the drawing, and the cast made. When the bobber strikes the water it will float thereon and the line, carrying the hook and sinker, will pass freely through the float until further movement of the line is interrupted by engagement of the knot 18 with the upper end of the float and in which position the hook and sinker will be suspended in the water in the usual manner and any nibble or bite on the bait will be indicated by the movement of the float. If desired, the recesses 16 may be omitted and also the bearing blocks 9, although it has been found preferable to employ the bearing blocks to prevent undue wear on the opposite ends of the float. The bobbers may be made in different sizes and shapes and painted or otherwise ornamented to protect them from the action of the elements and also to give them a neat and attractive appearance.

Having thus described the invention, I claim:

1. A fishing float comprising a compressible body having recesses in the opposite ends thereof and provided with a longitudinal slot opening through one side thereof, bearing members seated in said recesses and provided with substantially circular seats, and a single continuous tube mounted for turning movement in said body and provided with enlarged circular heads fitted in said seats and disposed substantially flush with the outer faces of the bearing members, said tube and heads being provided with a longitudinal slot adapted to register with the slot in the body to permit the insertion of a fishing line.

2. A fishing float comprising a compressible body having recesses formed therein at the opposite ends thereof, stationary bearing blocks seated in said recesses and provided with seats, there being auxiliary recesses formed in the body immediately below the blocks, and a single continuous tube mounted for rotation in the body and extending through said auxiliary recesses and having enlarged heads fitted in the seats, said tube and heads being provided with a longitudinal slot adapted to register with a slot in the body to permit the insertion of a fishing line.

3. A fishing float comprising a body of compressible material having a longitudinal slot therein and opening through one side thereof, bearing blocks fitted to the opposite ends of the body and provided with seats, and a single continuous tube mounted for turning movement within the body and provided with terminal heads fitted in said seats, said tube and heads being provided with a longitudinal slot adapted to register with the slot in the body to permit the insertion of a fishing line, the opposite ends of the body at the rear of the bearing blocks being recessed to form weakened portions to permit compression of said body when inserting the heads within the seats.

GERRIT DE VRIES. [L. S.]